United States Patent [19]

Goldmacher

[11] 3,745,577

[45] July 10, 1973

[54] VARIABLE SQUINT AND BEAMWIDTH AMPLITUDE MONOPULSE RADAR

[75] Inventor: Irving I. Goldmacher, Stamford, Conn.

[73] Assignee: United Aircraft Corporation, East Hartford, Conn.

[22] Filed: Mar. 29, 1972

[21] Appl. No.: 239,274

[52] U.S. Cl. ............................................. 343/16 M
[51] Int. Cl. ............................................. G01s 9/22
[58] Field of Search ...................... 343/16 M, 16 R

[56] References Cited
UNITED STATES PATENTS 3,271,776  9/1966  Hannan .......................... 343/16 M
3,618,092  11/1971  Waineo .......................... 343/16 M

*Primary Examiner*—Benjamin A. Borchelt
*Assistant Examiner*—G. E. Montone
*Attorney*—Melvin Pearson Williams

[57] ABSTRACT

In an amplitude monopulse radar, a cross coupling network between the respective feeds of a dual-radiator, angle measuring antenna array, couples energy from each feed into the other, with variable phase and amplitude adjustments to the energy coupled from one feed to the other feed, thereby providing, in effect, an artificial alteration in the intercoupling between the elements of the antenna array, in a manner to control the squint angle (or angle off of boresight) and beamwidth of the array.

6 Claims, 3 Drawing Figures

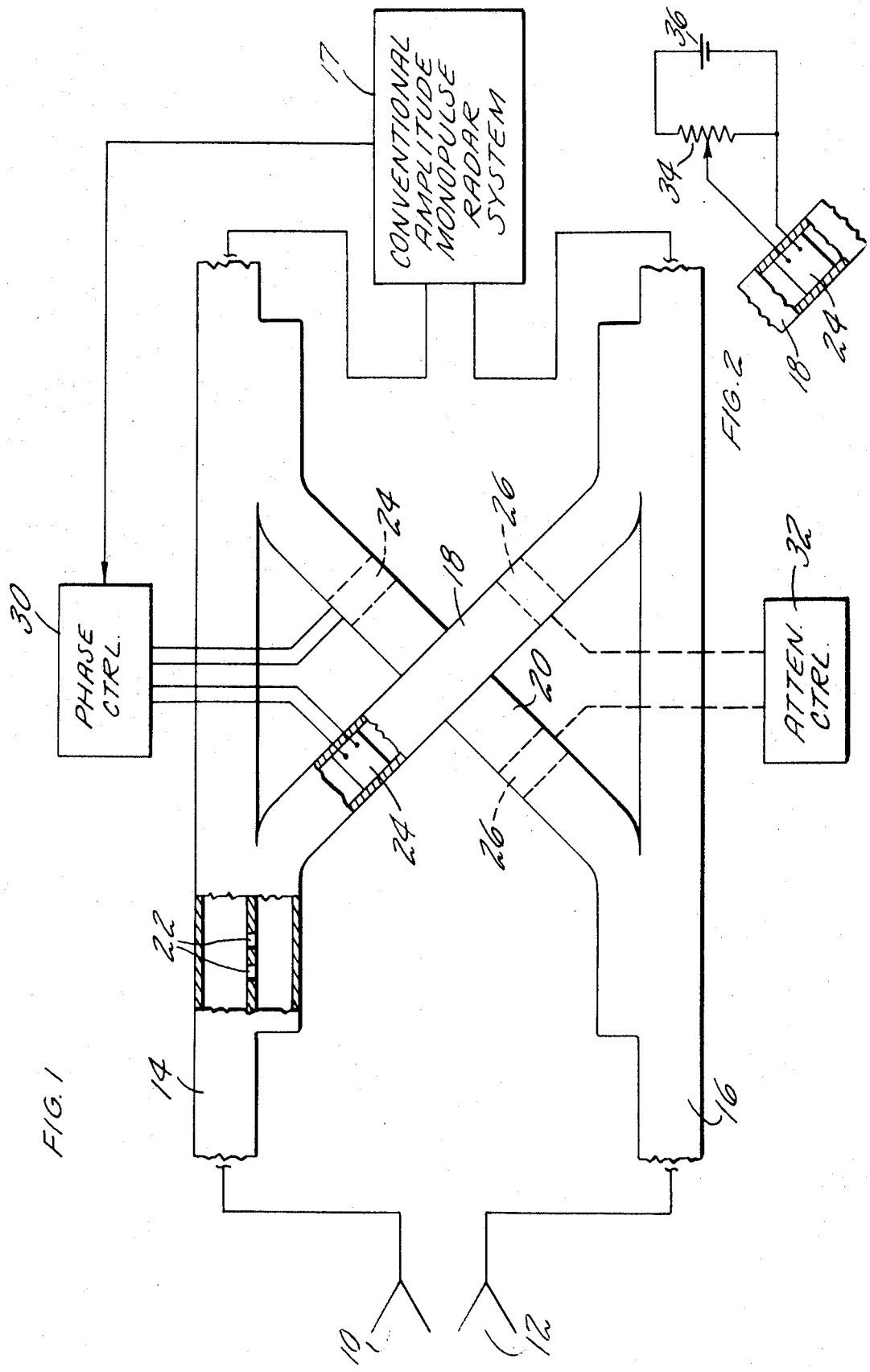

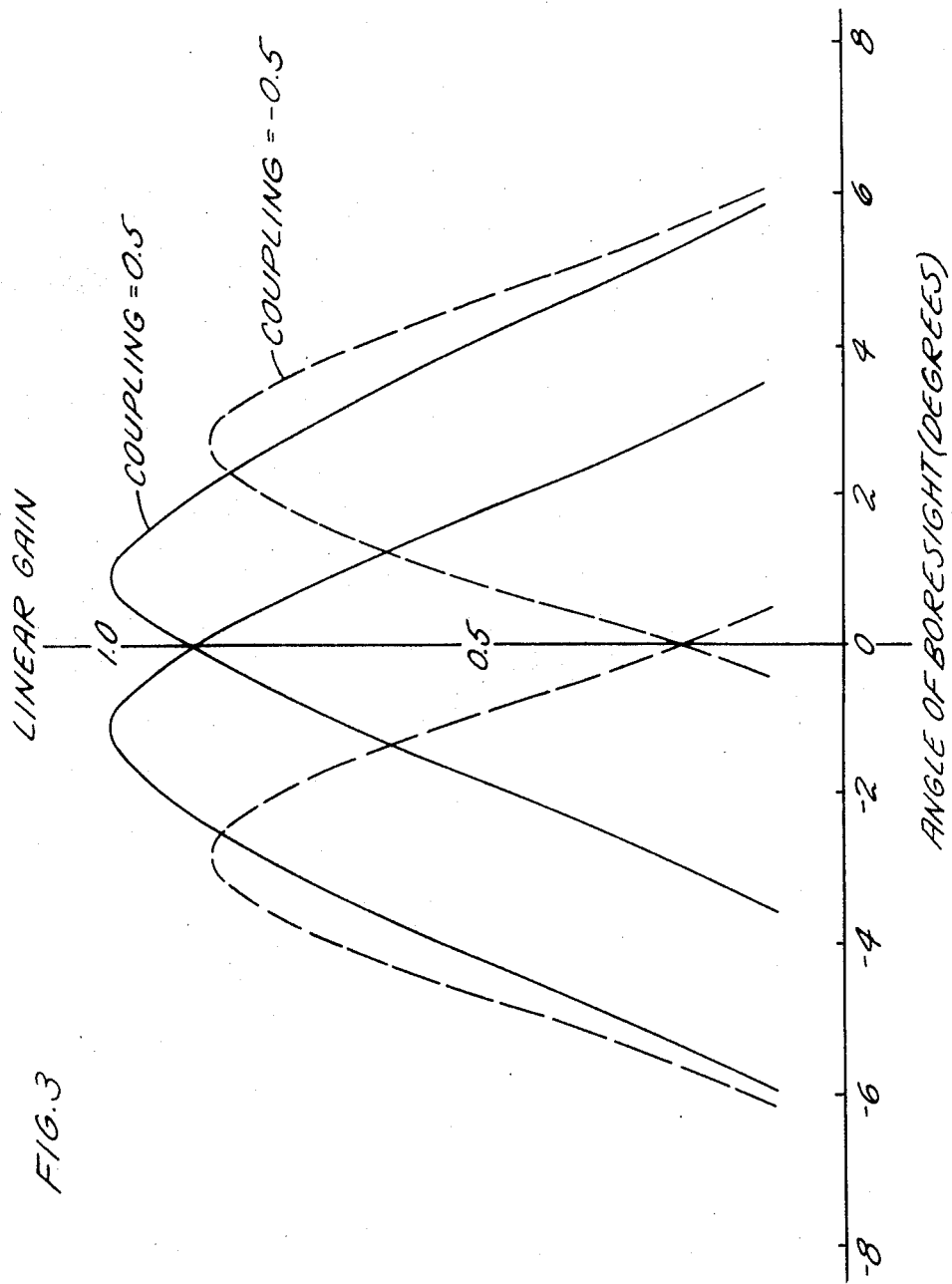

VARIABLE SQUINT AND BEAMWIDTH AMPLITUDE MONOPULSE RADAR

BACKGROUND OF THE INVENTION

1. Field of Invention

This invention relates to amplitude monopulse radar systems, and more particularly to apparatus for altering the characteristics of the antenna thereof.

2. Description of the Prior Art

One form of angle-measuring radar system known to the prior art is an amplitude monopulse system which compares the amplitude of signals generated in each of a pair of spaced antennas, the difference in amplitude of which is an indication of the angle of incidence of radar return signals at the respective antennas.

One problem which has recently been noted with respect to the amplitude monopulse radar system is referred to as overmodulation, which results from the fact that a moving target provides a relatively weaker signal than does stationary clutter about the moving target, so that the system, in a sense, tends to track the weaker target. However, when the target presents a very good reflecting surface at the angle of incidence of the radar energy, it becomes an extremely strong target which interferes with the operation of the device, thereby deteriorating its performance. In order to avoid this situation, it is desirable to provide a transmitted beam pattern having a reduced beam intensity at its center in the far field, thereby to reduce the intensity of the return signal from the target being tracked. This is most readily achieved by providing "squint" in the two radiators in a duplex array from which the radar energy is being transmitted. In a sense, this means bending the beams outwardly relative to the boresight of the duplex antenna array.

It is further known that the angle resolving transfer characteristic of an amplitude monopulse radar varies with the squint angle. In each case, the output voltage is a monotonic function of the angle of incidence over a certain range of incident angles, and then becomes ambiguous. As the squint angle decreases, the characteristic becomes flattened (less sensitivity), but the monotonic range of the angle resolving characteristic increases, thereby permitting measurement of angles to targets which are off the boresight of the antenna by a greater amount.

The squinting of the two radiation pattern of a dual radiator array by means known to the art is limited to complex mechanical adjustments to the position of the feedhorns, which typically feed the energy into a reflecting parabolic dish. However, mechanical feedhorn positioning devices are complex, expensive and heavy, and therefore are not well suited to many applications, particularly to accurate airborne systems. In addition, controlling the response thereof in an on-line, real-time situation, in response to the signals received by the radar, is difficult due to the inherent slow response characteristics of such mechanical devices. In addition, it is difficult to achieve the very percise alignments of the various mechanical components, particularly on a scanning basis, where backlash and other well known mechanical problems limit the accuracy within which squinting of the beam can be achieved.

SUMMARY OF INVENTION

The object of the present invention is to provide practical, electronic control over the angle of squint of the radiator patterns of a dual radiator, amplitude monopulse radar system antenna.

According to the present invention, a portion of the energy in each feed of respective ones of a dual radiator antenna array, in an amplitude monopulse radar system, is coupled into the opposite feed with a variable phase and amplitude adjustment, thereby to effectively alter the antenna characteristics in a manner to control the squint angle of the individual radiator antenna patterns.

The present invention provides for the adjustment of squint angle in a pair of antennas without the need for mechanical movement of antenna feeds or radiators, and permits electronic control over the squint angle of the antennas.

Other objects, features and advantages of the present invention will become more apparent in the light of the following detailed description of an exemplary embodiment thereof, as illustrated in the accompanying drawing.

BRIEF DESCRIPTION OF THE DRAWING

FIG. 1 is a simplified schematic illustration of an antenna feed incorporating the present invention;

FIG. 2 is a simplified schematic illustration of one form of control for use in the embodiment of FIG. 1; and FIG. 3 is an illustration of beam patterns in a duplex antenna system incorporating the present invention.

DESCRIPTION OF THE PREFERRED EMBODIMENT

Referring now to FIG. 1, a pair of radar antenna radiating elements 10, 12 are schematically illustrated as being connected through respective feeds 14, 16 which may typically comprise waveguides, or other suitable RF or microwave transmission lines, to a conventional amplitude monopulse radar system 17. As an example for illustrative purposes herein, the feeds 14, 16 are waveguides provided with cross coupling waveguides 18, 20. The coupling sections 18, 20 may each comprise sections of waveguide which form, with the feeds 14, 16, couplers of the type where intercoupling apertures or slots 22 are provided in a common wall of the two waveguides so as to permit exchange of energy therebetween. Each of the cross coupling sections 18, 20 includes a variable phase device 24 and a variable attenuating device 26 so as to be able to adjust the phase and amplitude of the coupled energy relative to the energy in the feeds 14, 16. This allows vector summation and subtraction of portions of the wave in each feed, at different relative phase angles, with the waves in the other feed. The phase adjusting device 24 may typically comprise a ferrite having a winding thereon to permit varying the magnetic field in the ferrite. The variable attenuating device 26 may typically comprise a dielectric vein, the position of which is adjusted within the waveguide so as to alter the amount of energy absorbed thereby. Other suitable phase and attenuation devices may be utilized as is known in the art. Because of the interference between the pair of closely spaced antenna radiating elements 10, 12, it is known that the characteristics of the duplex antenna differs from the summation of the individual characteristics thereof, in a manner which is somewhat analogous to the operation of a phased array antenna. In the present case, since angle information has to be derived from two completely separate channels, it has been found that reciprocal operation (that is, both in transmit and receive) can be achieved by cross coupling of the feeds, which provides an effective alteration of the antenna characteristics. Even though the squint angle varies so that the individual patterns radiated by the antennas are at different relative angles to each other as the relative squinting is effected, in the far field there is a summation beam which is on boresight, so long as the two beams are disposed symmetrically about the boresight, but the beamwidth of which varies as a function of the squint angle between the individual feeds. With respect to received signals, by cross coupling the two feeds into one another, the relation between the waves in the two feeds is altered in a complementary fashion to that which occurs on transmission, thus preserving the nature of the information.

The variable phase devices 24 may have the current therein adjusted automatically by phase control circuitry 30 which in turn is responsive to the radar system 17, which typically may include a beam steering computer to control the squinting of the beam outwardly (done mechanically in the prior art), or other control to achieve the desired effect. Similarly, the variable attenuators 26 may be operated in response to attenuation control means 32 under the control of signals from the radar system 17. On the other hand, as illustrated in FIG. 2, the variable phase devices 24 may be controlled manually in any simple fashion, such as by a potentiometer 34 which is adjusted to provide a suitable current through the variable phase device 24 in response to an electrical potential 36.

Similarly, the variable attenuation devices 26 may be manually controlled if desired. Other forms or control may include electromagnetic or electrostatic attraction of a member secured to the veins within the waveguide.

Cross coupling of the signals with variable phase and attenuation simply provides vector summation of the two waveforms which causes the antennas to act differently than they would without them, and this control can be suitably adjusted so as to achieve beam spreading to accommodate over modulation, or to flatten the transfer characteristic of the angle resolving circuitry so as to increase the unambiguous angle resolving capability of the system, as described hereinbefore. The manner and nature of the controls provided thereto are immaterial to the present invention.

The alteration of the pattern is shown in FIG. 3 for coupling half voltage, in phase and out of phase, respectively; these are special cases; other phase and voltage coupling yields different results.

Since the alteration of the transfer characteristic of the angle resolving circuitry necessarily alters the sensitivity (voltage as a function of angle of incidence of a returned wave), some form of compensation must be provided. However, the better quality conventional amplitude monopulse radar systems currently in use include closed-loop feedback to eliminate errors, which automatically calibrates the system on a pulse by pulse basis. Thus, in a sophisticated amplitude monopulse radar system, for which the present invention is primarily intended, compensation for the alteration of system response as a function of squint angle is automatic. Use of other systems would require providing closed loop feedback so as to achieve this result.

Although the invention has been shown and described with respect to a preferred embodiment thereof, it should be understood by those skilled in the art that the various changes and omissions in the form and detail thereof may be made therein without departing from the spirit and the scope of the invention.

Having thus described a typical embodiment of my invention, that which I claim as new and desire to secure by Letters Patent of the United States is:

1. An antenna feed system including a pair of transmission lines for respectively coupling a pair of spaced antenna radiating elements to corresponding channels in a conventional amplitude monopulse radar system, the improvement comprising:
   a pair of radar signal transmission paths, each coupling energy from one of said transmission lines into the other of said transmission lines, each including means to vary the phase and the amplitude of the electromagnetic energy coupled from one of said transmission lines into the other of said transmission lines, said phase and amplitude varying means adapted to vary the signals in said transmission lines in a manner to alter the individual radiation patterns of said radiating elements.

2. The improvement according to claim 1 wherein said phase and amplitude varying means are adjustable.

3. The improvement according to claim 2 wherein said phase varying means comprises a ferrite core having an electrical coil thereon and means for adjusting the current in said coil.

4. The improvement according to claim 2 wherein said means for altering the amplitude of said electromagnetic signals comprises a dielectric vein rotatably disposed in respective ones of said transmission lines.

5. The improvement according to claim 1 wherein said transmission lines and said radar signal transmission paths comprise waveguides.

6. The improvement according to claim 5 wherein said cross coupling waveguides include a common wall with said feed waveguides, and coupling is achieved by apertures in said common wall.

* * * * *